(12) United States Patent
Keith, III

(10) Patent No.: US 12,156,593 B2
(45) Date of Patent: Dec. 3, 2024

(54) TELEVISION MOUNT CONCEALER ASSEMBLY

(71) Applicant: JK3 Ventures LLC, Atlanta, GA (US)

(72) Inventor: James Keith, III, Atlanta, GA (US)

(73) Assignee: JK3 Ventures LLC, Atlanta, GA (US)

( * ) Notice: Subject to any disclaimer, the term of this patent is extended or adjusted under 35 U.S.C. 154(b) by 0 days.

(21) Appl. No.: 18/296,750

(22) Filed: Apr. 6, 2023

(65) Prior Publication Data
US 2023/0240446 A1    Aug. 3, 2023

Related U.S. Application Data

(62) Division of application No. 17/168,537, filed on Feb. 5, 2021, now Pat. No. 11,653,762.

(51) Int. Cl.
*A47B 97/00* (2006.01)
*F16M 13/02* (2006.01)

(52) U.S. Cl.
CPC .......... *A47B 97/001* (2013.01); *F16M 13/02* (2013.01); *F16M 2200/061* (2013.01)

(58) Field of Classification Search
CPC .............................. A47B 97/001; F16M 13/02
USPC ......................................... 248/917, 918, 919
See application file for complete search history.

(56) References Cited

U.S. PATENT DOCUMENTS

| | | | |
|---|---|---|---|
| 7,337,024 B1 * | 2/2008 | Graham ................. | F16M 11/38 312/297 |
| 8,382,052 B1 * | 2/2013 | Mathieson ........... | F16M 11/048 248/240.1 |
| 2007/0164646 A1 * | 7/2007 | Raab ........................ | G09F 7/18 312/405.1 |
| 2007/0170336 A1 * | 7/2007 | Li .......................... | F16M 13/02 248/917 |

* cited by examiner

*Primary Examiner* — Alfred J Wujciak
(74) *Attorney, Agent, or Firm* — Thomas | Horstemeyer, LLP

(57) ABSTRACT

Various embodiments of a television mount concealer assembly and a method of operating the television mount concealer assembly are described. In one example, the television mount concealer assembly can include a television mount and an adjustable concealer assembly for placement behind a wall-mounted television. The adjustable concealer assembly comprising a front panel, a rear panel, a first flexible sidewall, and a second flexible sidewall. The rear panel can be configured to be placed adjacent to a wall in which a television is mounted, and the front panel can be adjusted between a first position and a second position in order to expand and contract the adjustable concealer assembly.

15 Claims, 5 Drawing Sheets

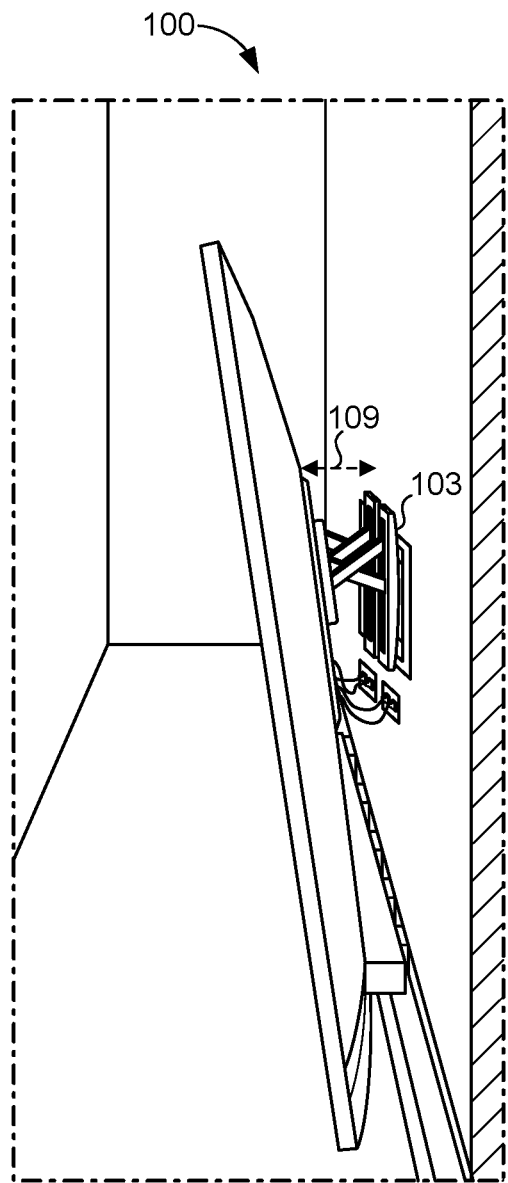 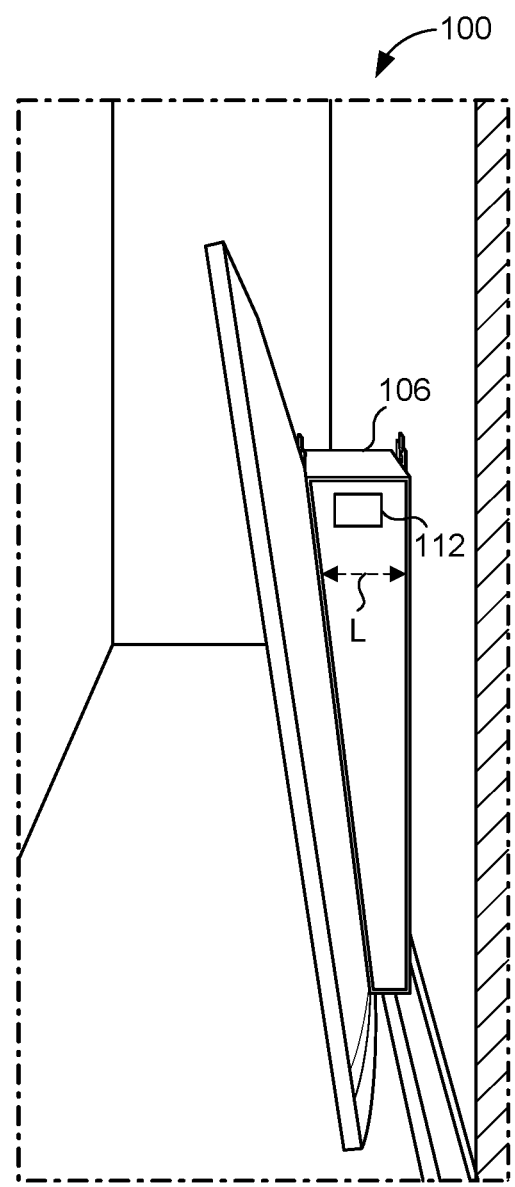
FIG. 1A  FIG. 1B

TELEVISION MOUNT CONCEALER ASSEMBLY

CROSS-REFERENCE TO RELATED APPLICATIONS

This application is a divisional of, and claims priority to, co-pending U.S. patent application entitled "Television Mount Concealer Assembly," filed on Feb. 5, 2021, and assigned application Ser. No. 17/168,537, which is incorporated herein by reference in its entirety.

BACKGROUND

As televisions have reduced in weight and depth, consumers have increasingly started to mount their televisions on walls. For example, a television can be attached to a television mount, and the television mount can be attached to a wall. Television cables can be routed from the television to a hole in the wall that is near the television mount.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1A is a perspective view of a television and a television mount attached to a wall, according to one embodiment described herein.

FIG. 1B is a perspective view of an adjustable concealer assembly placed on the television mount from FIG. 1A, according to one embodiment described herein.

DETAILED DESCRIPTION

Figure 2A:
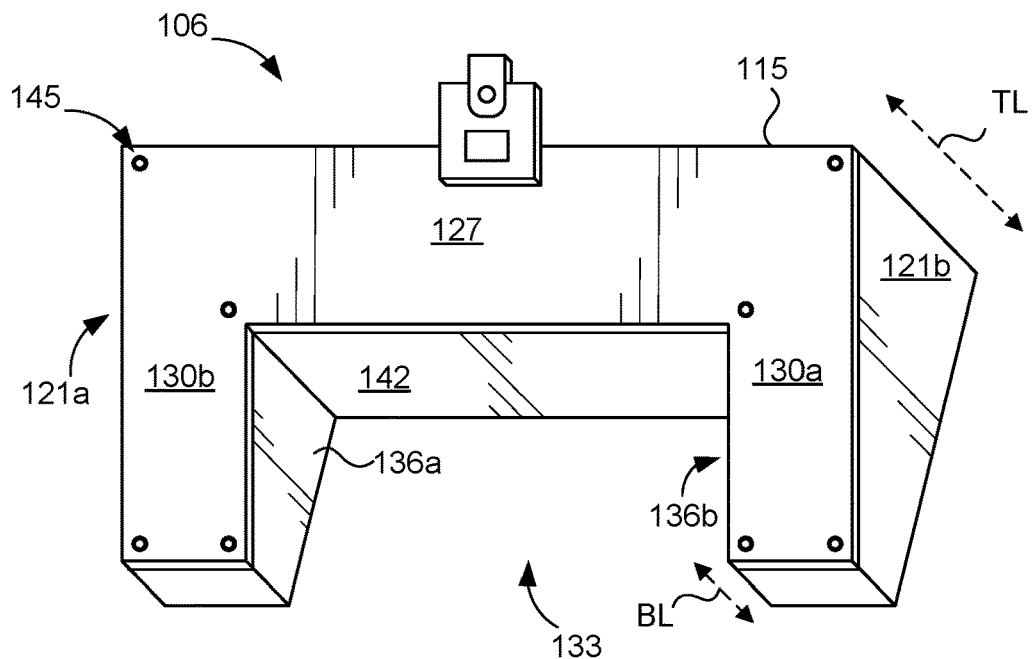
FIGS. 2A and 2B illustrate perspective views of the adjustable concealer assembly from FIG. 1B, according to one embodiment described herein.

The embodiments of the present disclosure relate to a television mount concealer assembly and methods of operating the television mount concealer assembly. Overtime, televisions have reduced in weight and depth substantially. The size reduction has enabled televisions to be mounted on walls in order to save space or to eliminate the need for a television stand. Thus, the television can be attached to a television mount, and the television mount can be attached to a wall. The television mount assemblies can be configured in a variety of manners. The television mount assemblies are built to certain dimensions in order to adequately support a television of a certain size. As a result, the television mount assemblies often times protrude a noticeable distance from the wall, which in turn causes a gap between the television and the wall. The gap can be problematic because it exposes television cables and the television mount assembly from side vantage points of the television. Accordingly, these components can be unsightly, especially in small rooms or areas that have a television mounted on a wall.

Accordingly, the embodiments of the present disclosure relate to a television mount concealer assembly that is configured to conceal television cables, television mounting assembly components, a hole in the wall for the television cables, and other aspects associated with a wall-mounted television. Additionally, the embodiments of the television mount concealer assembly can include aesthetic components, such as lighting devices, logos, design patterns, and other components that may enhance the aesthetics of a room or an area.

With reference to FIG. 1A and FIG. 1B, shown are perspective views of components of a television mount concealer assembly 100. FIG. 1A illustrates a perspective view of a television and a television mount 103 attached to a wall. FIG. 1B illustrates a perspective view of a television mount concealer assembly 100, in which the television mount 103 is concealed from view. The television mount concealer assembly 100 can include a television mount 103 and an adjustable concealer assembly 106.

FIG. 1A illustrates that the television mount 103 is attached to a television and television cables are routed from the television to multiple ports or holes in the wall. FIG. 1A also illustrates a gap 109 from the television to the wall. The gap 109 can be a result of one or more dimensions of the television mount 103. For example, the television mount 103 can have a particular depth from the wall to one or more attachment points to the television. As a result, the television has a noticeable gap 109 behind it, in which the television mount 103, the television cables, and other components are viewable from side vantage points. In some spaces, the gap 109 may be unappealing because it exposes the components behind the television.

FIG. 1B illustrates the adjustable concealer assembly 106 in an expanded state in order to conceal the television mount 103 and the television cables. The adjustable concealer assembly 106 can also include a placement holder 112 on a side of the adjustable concealer assembly 106. The placement holder 112 can be used to attach aesthetic components, such as a logo, an advertisement, a lighting device, and other suitable items. In some examples, the placement holder 112 may include clips, brackets, and other suitable mechanical fastening components.

The adjustable concealer assembly 106 has a length "L" that is adjustable. In some examples, the length "L" can represent a distance from the wall to a back of the television because a front portion of the adjustable concealer assembly 106 is adjacent to a back of the television and a second portion of the adjustable concealer assembly 106 is adjacent to the wall. The length "L" of the adjustable concealer assembly 106 can be manipulated before or after placement of the adjustable concealer assembly 106 on the television mount 103.

Figure 2B:
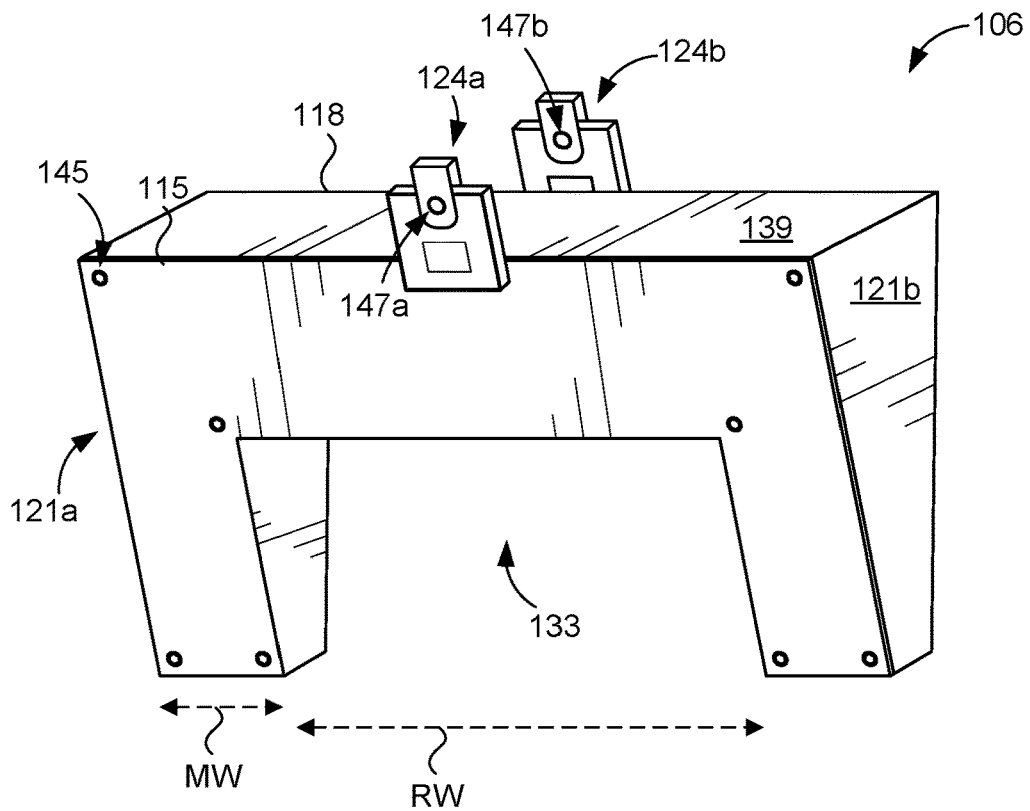

With reference to FIGS. 2A and 2B, shown are perspective views of the adjustable concealer assembly 106 in an expanded state. FIG. 2A illustrates a bottom-up perspective view of the adjustable concealer assembly 106, and FIG. 2B illustrates a top-down perspective view of the adjustable concealer assembly 106.

The adjustable concealer assembly 106 includes a front panel 115, a rear panel 118, a first flexible sidewall 121a, a second flexible sidewall 121b, a first tab 124a, a second tab 124b, and other suitable components. The front panel 115 can be attached to the first flexible sidewall 121a and the second flexible sidewall 121b (collectively "the flexible sidewalls 121"). The first tab 124a can be attached to the front panel 115, and the second tab 124b can be attached to the rear panel 118.

The adjustable concealer assembly 106 can also include a first interior flexible sidewall 136a, a second interior flexible sidewall 136b, a top flexible wall 139, and a bottom flexible wall 142. The first interior flexible sidewall 136a and the second interior flexible sidewall 136b (collectively "the interior flexible sidewalls 136") can be attached to the front panel 115 and the rear panel 118. The interior flexible sidewalls 136 can expand and contract as the front panel 115 and/or the rear panel 118 are moved toward or away from each other.

Top flexible wall 139 and the bottom flexible wall 142 can be attached to the front panel 115 and the rear panel 118. The top flexible wall 139 and the bottom flexible wall 142 can expand and contract as the front panel 115 and/or the rear panel 118 are moved toward or away from each other.

In some embodiments, the front panel 115 and the rear panel 118 can be rigid members that include a horizontal member 127 that has a first end and a second end. The front panel 115 and the rear panel 118 can also include a first vertical member 130a that extends from the first end of the horizontal member 127, and a second vertical member 130b that extends from the second end of the horizontal member 127. In some embodiments, the rear panel 118 can be a ridge member that matches the shape of the front panel 115, as shown in FIGS. 2A and 2B. Additionally, the front panel 115 and the rear panel 118 can be comprised of plastic, wood, metal, and other suitable materials.

The adjustable concealer assembly 106 can include a slot 133 that is formed from one or both of the front panel 115 and/or the rear panel 118. In some examples, the slot has a U-shape. The slot 133 can be configured to receive the television mount 103. As shown in FIGS. 2A and 2B, the slot 133 can be formed by multiple components of the adjustable concealer assembly 106, such as the interior flexible sidewall 136 and the bottom flexible wall 142. Further, FIGS. 2A and 2B illustrate that there are four adjustable rod assemblies 145 along the perimeter of the slot 133. As illustrated, the slot 133 has a recessed rectangular shape. It should be appreciated that the shape of the slot 133 can vary.

The flexible sidewalls 121, the interior flexible sidewalls 136, the top flexible wall 139, and the bottom flexible wall 142 can expand and contract. The flexible sidewalls 121, the interior flexible sidewalls 136, the top flexible wall 139, and the bottom flexible wall 142 can comprise of a stretchable microfiber material, such as polyester, polyamides, polypropylene, different combinations of these materials, and other suitable stretchable materials. The flexible sidewalls 121, the interior flexible sidewalls 136, the top flexible wall 139, and the bottom flexible wall 142 can be configured in a corrugated flexible surface (FIG. 4) that enables for a wall to collapse in an orderly manner. In some instances, the corrugated flexible surface can prevent the walls for unintentionally attaching to other components. Further, the flexible sidewalls 121, the interior flexible sidewalls 136, the top flexible wall 139, and the bottom flexible wall 142 can include lighting devices for creating different lighting effects from behind the television.

The adjustable concealer assembly 106 can include a plurality of adjustable rod assemblies 145 located at various locations. For example, in FIGS. 2A and 2B, the adjustable rod assemblies 145 are located near a corner area of the adjustable concealer assembly 106. It should be appreciated that the location and the quantity of adjustable rob assemblies 145 can vary.

The tabs 124 can be configured to be attached to the wall and/or the back of a television. For example, the first tab 124a can be attached to the back of the television, and the second tab 124b can be attached to the wall which has the television mount 103. As illustrated, the tabs 124 can include an aperture 147a, 147b for receiving a fastener. For example, a nail can be inserted through aperture 147b in order to attach the second tab 124b to the wall. In some instances, the tabs 124 can include an adhesive layer for attaching to a wall or a back of a television. The tabs 124 can also include a fastener, such as a clip, a bracket, or other suitable components for attaching the adjustable concealer assembly 106 to the television, the wall, the television mount 103, or other components.

Additionally, FIGS. 2A and 2B illustrate the adjustable concealer assembly 106 in an expanded state. In the expanded state, the adjustable concealer assembly 106 has a top length "TL" that is greater than a bottom length "BL." As a result, in some cases, the front panel 115 or the rear panel 118 may be positioned at an angle, as shown in FIG. 1B. In some instances, both the front panel 115 and the rear panel 118 are angled or slanted toward each other at the bottom of the adjustable concealer assembly 106. Further, FIG. 2B illustrates that the adjustable concealer assembly 106 has a recessed width "RW" that is larger than a member width "MW." The recessed width "RW" is the width of the slot 133. The member width "MW" is a width of the first vertical member 130a and/or the second vertical member 130b.

In some embodiments, the top length "TL" can be in a range of two inches to ten inches, and the bottom length "BL" can be in a range of 0.1 inches to five inches. The member width "MW can be in a range of three inches to ten inches, and the recessed width "RW" can be in a range of ten inches to thirty inches. For example, one embodiment can include a member width "MW" of five inches, and a recessed width "RW" of twenty inches. Additionally, the top length "TL" can be six inches, and the bottom length "BL" can be one inch.

Figure 3A:
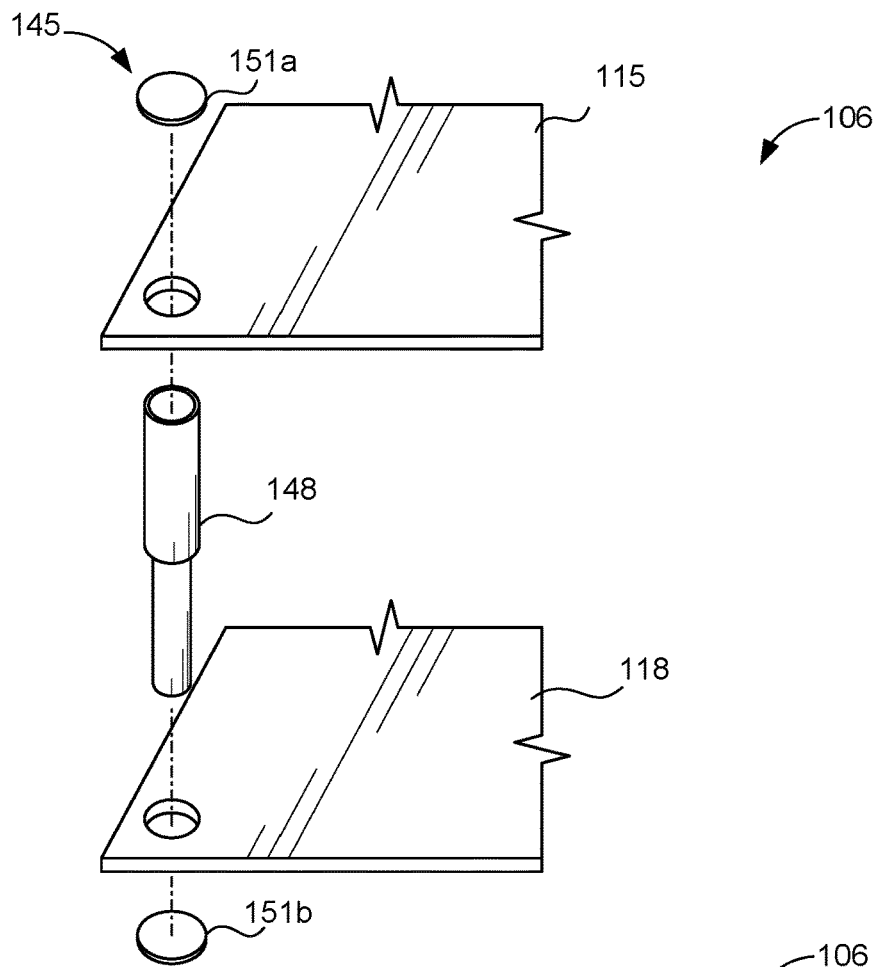
FIGS. 3A and 3B illustrate enlarged views of aspects of the adjustable concealer assembly from FIGS. 2A and 2B, according to one embodiment described herein.
Figure 3B:
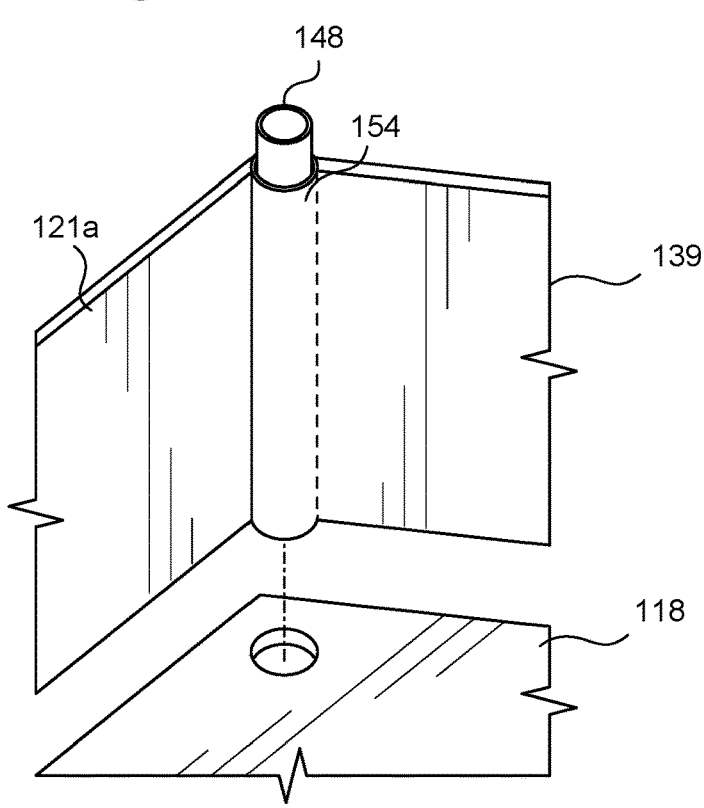

With reference to FIGS. 3A and 3B, shown are different aspects of a corner area of the adjustable concealer assembly 106 with some aspects omitted from view. For example, FIG. 3A illustrates the adjustable rod assembly 145 with the front panel 115 and the rear panel 118, in which the top flexible wall 139 and the first flexible sidewall 121a are omitted. Although the adjustable rod assembly 145 is illustrated in a corner of the adjustable concealer assembly 106, the location of the adjustable rod assembly 145 can vary. For instance, the adjustable rod assembly 145 can be positioned at various locations along the perimeter of the front panel 115 and the rear panel 118. Additionally, in some embodiments, the adjustable rod 148 can have an adjustable length that may range from 0.2 inches to fifteen inches. For example, the adjustable length may be collapsed to one half an inch in width when the adjustable concealer assembly 106 is in a collapsed state. In an expanded state, the adjustable rod 148 can extend its length to a maximum length of eight inches. Further, in some embodiments, the adjustable rod assemblies 145 at the bottom of the adjustable concealer assembly 106 may have a maximum length that is smaller than the adjustable rod assemblies 145 located at the top of the adjustable concealer assembly 106.

The adjustable rod assembly 145 includes an adjustable rod 148, a first cap 151a, a second cap 151b, and other suitable components. The adjustable rod 148 can expand and contract its length. The adjustability in length of the adjustable rod 148 can be used to expand and contract the adjustable concealer assembly 106. In some embodiments, the adjustable rod 148 can be a telescopic rod that can contract into or expand from a cylindrical exterior structure. In another embodiments, the adjustable rod 148 can include a spring for expanding and contracting its length.

The first cap 151a and the second cap 151b (collectively "the caps 151") can be configured to cover to the ends of the adjustable rod 148. As illustrated in FIG. 3A, the adjustable rod 148 has openings on each of its end. The caps 151 can be inserted into through apertures in the front panel 115 and the rear panel 118 and into the ends of the adjustable rod 148. In some embodiments, the caps 151 may be omitted or the caps 151 may be an integrated component of the adjustable rod 148. When inserted, the top surface of the caps 151 can be in alignment with the front panel 115 and the rear panel 118. In some examples, the caps 151 are attached to the front panel 115 and the rear panel 118.

FIG. 3B illustrates the top flexible wall 139 and first flexible sidewall 121a of the adjustable concealer assembly 106, in which the front panel 115 and the caps 151 are omitted from view. The top flexible wall 139 and the first flexible sidewall 121a are attached to a sleeve 154. The sleeve 154 can extends from the front panel 115 to the rear panel 118. The sleeve 154 is configured to receive the adjustable rod 148 in its interior. The adjustable concealer assembly 106 can have multiple sleeves 154 along its perimeter for containing the multiple adjustable rods 148. According, the components in FIGS. 3A and 3B are reflected in the adjustable concealer assembly 106 of FIGS. 2A and 2B.

Figure 4:
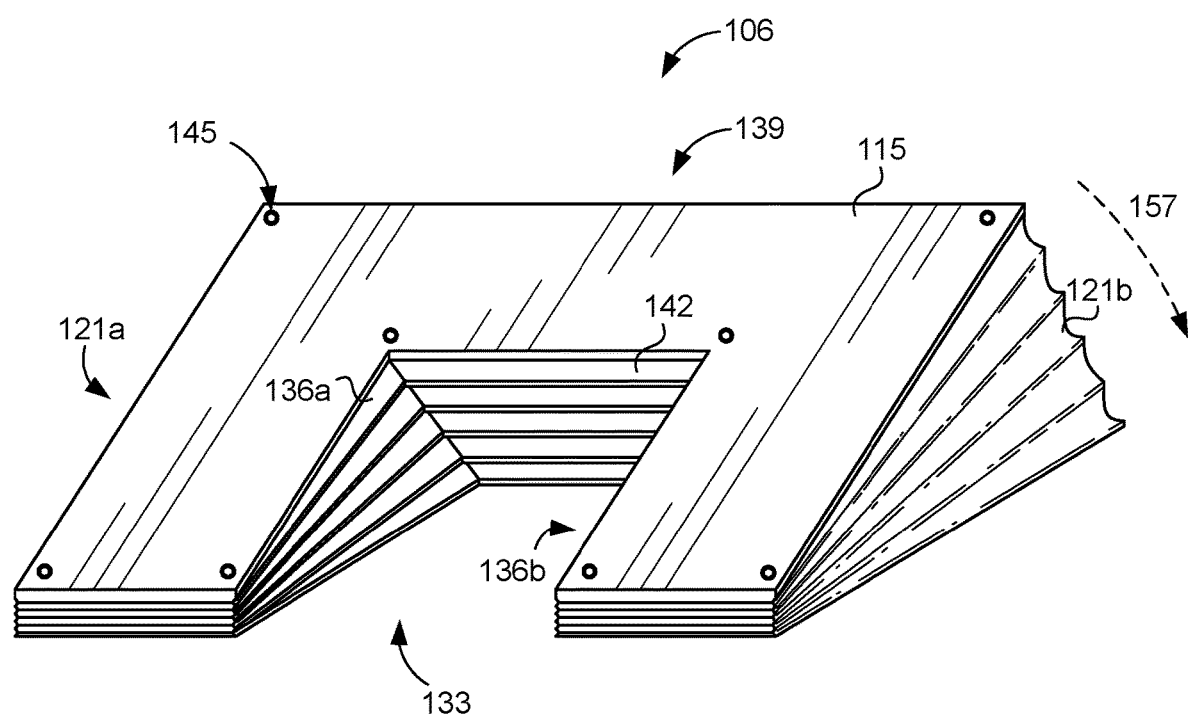
FIG. 4 illustrates a contracted state for the adjustable concealer assembly from FIGS. 2A and 2B, according to one embodiment described herein.

Next, FIG. 4 illustrates the adjustable concealer assembly 106 transitioning from an expanded state to a collapsed state, as indicated by reference arrow 157. FIG. 4 could also represent the adjustable concealer assembly 106 transitioning from the collapsed state to the expanded state, in which is shown in FIGS. 2A and 2B. The adjustable concealer assembly 106 can expand and contract by manipulating components of the adjustable rod assemblies 145. For example, the adjustable rod 148 can be manipulated to expand or contract its length.

According to some embodiments, the front panel 115 can be pushed toward the rear panel 118. The adjustable rods 148 can contract as the front panel 115 is pushed toward the rear panel 118, as such the length of the adjustable rods 148 are reduced. Alternatively, the front panel 115 can be pulled or moved away from the rear panel 118 in order to expand the adjustable concealer assembly 106. Thus, the adjustable rods 148 can expand in length as the front panel 115 is pulled away from the rear panel 118.

As the adjustable concealer assembly 106 collapses, the flexible sidewalls 121, the interior flexible sidewalls 136, the bottom flexible wall 142, and the top flexible wall 139 contract. In some embodiments, as shown in FIG. 4, the flexible sidewalls 121, the interior flexible sidewalls 136, the bottom flexible wall 142, and the top flexible wall 139 can collapse in a folded manner because the walls may be constructed as corrugated walls. As such, the flexible sidewalls 121, the interior flexible sidewalls 136, the bottom flexible wall 142, and the top flexible wall 139 can collapse in a tight and organized arrangement.

Figure 5:
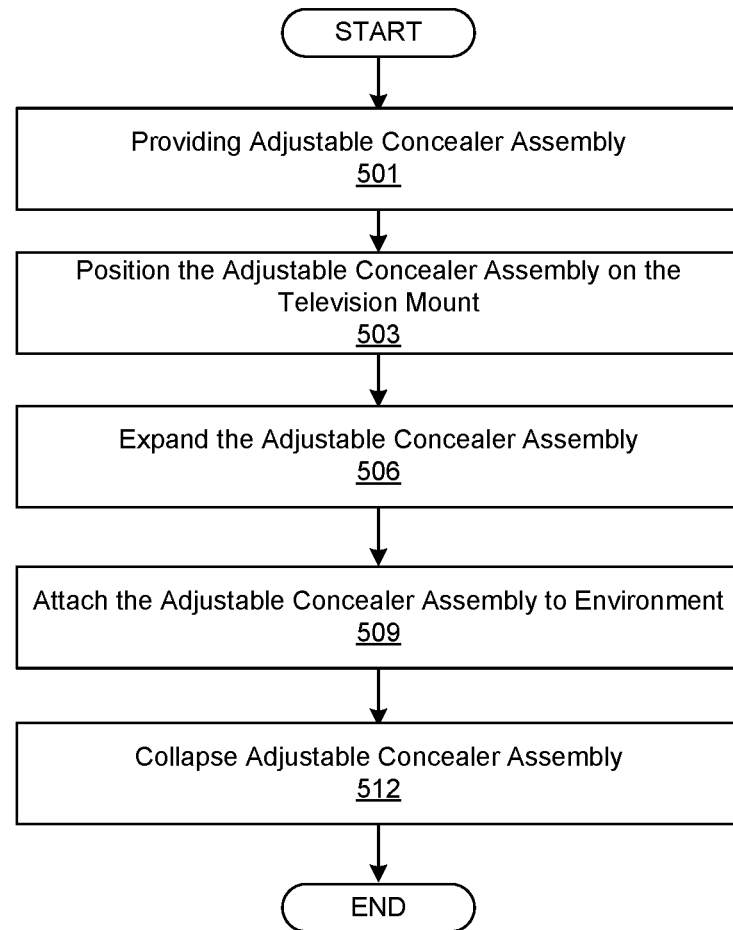
FIG. 5 is a flowchart illustrating one example of the operation of the adjustable concealer assembly according to various embodiments of the present disclosure.

Referring next to FIG. 5, shown is a flowchart that provides one example process 500 for operating the adjustable concealer assembly 106, according to various embodiments. It is understood that the flowchart of FIG. 5 provides merely an example of the many different types of functional arrangements that may be employed to operate the adjustable concealer assembly 106 as described herein.

Beginning with box 501, the process 500 can include providing an adjustable concealer assembly 106 for concealing a television mount 103 that is attached to a wall. The adjustable concealer assembly 106 comprises a front panel 115, a rear panel 118, a first flexible sidewall 121a and a second flexible sidewall 121b. The front panel 115 and the rear panel 118 can be constructed with a slot 133 for receiving the television mount 103.

In box 503, the process 500 can involve positioning the television mount 103 in the slot 133 of the adjustable concealer assembly 106. The bottom flexible wall 142 can contact a top portion of the television mount 103. In some cases, the bottom flexible wall 142 can be attached to the television mount 103. For example, the bottom flexible wall 142 can have one or more recessed areas for receiving a protruding portion of the television mount 103. In other cases, the bottom flexible wall 142 can have one or more adhesive layers for attaching to the television mount 103.

In box 506, the process 500 can involve expanding the adjustable concealer assembly 106 by moving the front panel 115 away from the rear panel 118. The front panel 115 can be moved to different positions in order to expand the adjustable concealer assembly 106. In some examples, the front panel 115 may have a first position, in which the adjustable concealer assembly 106 is in a collapsed or contracted state. The front panel 115 can be moved to a second position, in which the adjustable concealer assembly 106 is an expanded state.

In some examples, the adjustable concealer assembly 106 can be placed in one of multiple positions between a fully expanded position and a fully collapsed position. For example, the adjustable rods 148 can have preset positions between the fully expanded position and the fully collapsed position. The adjustable rods 148 can slide into and out of one of the preset positions.

In box 509, the process 500 can involve attaching the adjustable concealer assembly 106 to the surrounding environment. In some examples, the adjustable concealer assembly 106 can be attached to the wall and/or the television. For example, the rear panel 118 can be attached to the wall in which the television mount 103 is attached. The second tab 124b may be attached to the wall by inserting a fastener (e.g., a screw, a nail, etc.) through an aperture 147b and inserting the fastener into the wall. In another example, the second tab 124b can have an adhesive layer for attaching to the wall.

Additionally, the first tab 124a can be attached to the back of the television. For example, the first tab 124a can have an adhesive layer for attaching to the back of the television. In other examples, the first tab 124a can have a clip, a hook, and other suitable fasteners for attaching the first tab 124a to a portion of the television.

In box 512, the process 500 can involve collapsing the adjustable concealer assembly 106. In some cases, the adjustable concealer assembly 106 may need to be unattached from a wall, a television, a television mount 103, or some other structure. After the adjustable concealer assembly 106 is unattached, the front panel 115 and the rear panel 118 can be moved toward each other. As such, the length of the adjustable rods 148 can decrease in order to collapse the adjustable concealer assembly 106. The adjustable concealer assembly 106 can be removed from the television mount 103. Then, the process 500 proceeds to the end.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for concealing a television cable, a television component or a hole in the wall, comprising:
   providing an adjustable concealer assembly for concealing a television mount that is attached to a wall, wherein the adjustable concealer assembly comprises a front panel, a rear panel, a first flexible sidewall and a second flexible sidewall, the front panel being attached to the first flexible sidewall and the second flexible sidewall, the rear panel being attached to the first flexible sidewall and the second flexible sidewall, wherein the front panel and the rear panel have a slot;
   positioning the slot of the adjustable concealer assembly on the television mount; and
   expanding the adjustable concealer assembly by moving the front panel toward a back of a television and by moving the rear panel toward the wall.

2. The method of claim 1, wherein expanding the adjustable concealer assembly further comprises expanding a length of a plurality of adjustable rods of the adjustable concealer assembly.

3. The method of claim 1, further comprising:
   attaching the rear panel to the wall; and
   attaching the front panel to the back of the television.

4. The method of claim 3, wherein the rear panel comprises a tab that has an adhesive layer.

5. The method of claim 3, wherein the front panel comprises an adhesive layer.

6. The method of claim 3, further comprising:
   detaching the rear panel to the wall;
   detaching the front panel to the back of the television; and
   collapsing the adjustable concealer assembly by moving the rear panel toward the front panel.

7. The method of claim 1, wherein the adjustable concealer assembly further comprises a bottom flexible wall that is attached to the front panel and the rear panel, and the slot is formed by the bottom flexible wall, the front panel, and the rear panel.

8. The method of claim 7, wherein positioning the slot of the adjustable concealer assembly on the television mount further comprises positioning the bottom flexible wall on top of the television mount.

9. The method of claim 1, wherein expanding the adjustable concealer assembly comprises a top length of the adjustable concealer assembly to be greater than a bottom length.

10. The method of claim 1, wherein the adjustable concealer assembly comprises a placement holder that can be configured to support an aesthetic component.

11. The method of claim 1, wherein the front panel or the rear panel comprises at least one of a clip or a bracket.

12. The method of claim 11, wherein the clip or the bracket is configured to attach to at least one of the television, the wall, or the television mount.

13. The method of claim 1, wherein the front panel or the rear panel has a fastener.

14. The method of claim 1, further comprising:
   attaching a bottom flexible wall of the adjustable concealer assembly to the television mount by mating a recessed area of the bottom flexible wall with a protruding portion of the television mount.

15. The method of claim 1, wherein the front panel or the rear panel comprises at least one of a plastic material, a wood material, or a metal material.

* * * * *